United States Patent
Nader et al.

(10) Patent No.: US 10,536,897 B2
(45) Date of Patent: Jan. 14, 2020

(54) ENERGY EFFICIENT OPERATION OF RADIO NETWORK NODES AND WIRELESS COMMUNICATION DEVICES IN NB-IOT

(71) Applicant: TELEFONAKTIEBOLAGET LM ERICSSON, Stockholm (SE)

(72) Inventors: Ali Nader, Malmö (SE); Yi-Pin Eric Wang, Fremont, CA (US); Ansuman Adhikary, Hyderabad (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/081,570

(22) PCT Filed: Mar. 1, 2017

(86) PCT No.: PCT/IB2017/051206
§ 371 (c)(1),
(2) Date: Aug. 31, 2018

(87) PCT Pub. No.: WO2017/149480
PCT Pub. Date: Sep. 8, 2017

(65) Prior Publication Data
US 2019/0182764 A1    Jun. 13, 2019

Related U.S. Application Data

(60) Provisional application No. 62/302,019, filed on Mar. 1, 2016.

(51) Int. Cl.
*H04W 52/02* (2009.01)
*H04W 24/02* (2009.01)

(52) U.S. Cl.
CPC ....... *H04W 52/0206* (2013.01); *H04W 24/02* (2013.01)

(58) Field of Classification Search
CPC ................................................ H04W 52/0206
See application file for complete search history.

(56) References Cited

U.S. PATENT DOCUMENTS

2011/0085611 A1* 4/2011 Laroia .................. H04B 7/2678
375/260

FOREIGN PATENT DOCUMENTS

EP          1949564 A2    7/2008

* cited by examiner

*Primary Examiner* — Ankur Jain

(57) ABSTRACT

A radio network node may operate in a normal or restricted operating state. In the restricted operating state, the radio network node may have just enough activity to enable UEs to detect the cell. The radio access node may transition to the normal operating state in response to messaging from a wireless communication device, such as reception of a random access preamble.

12 Claims, 12 Drawing Sheets

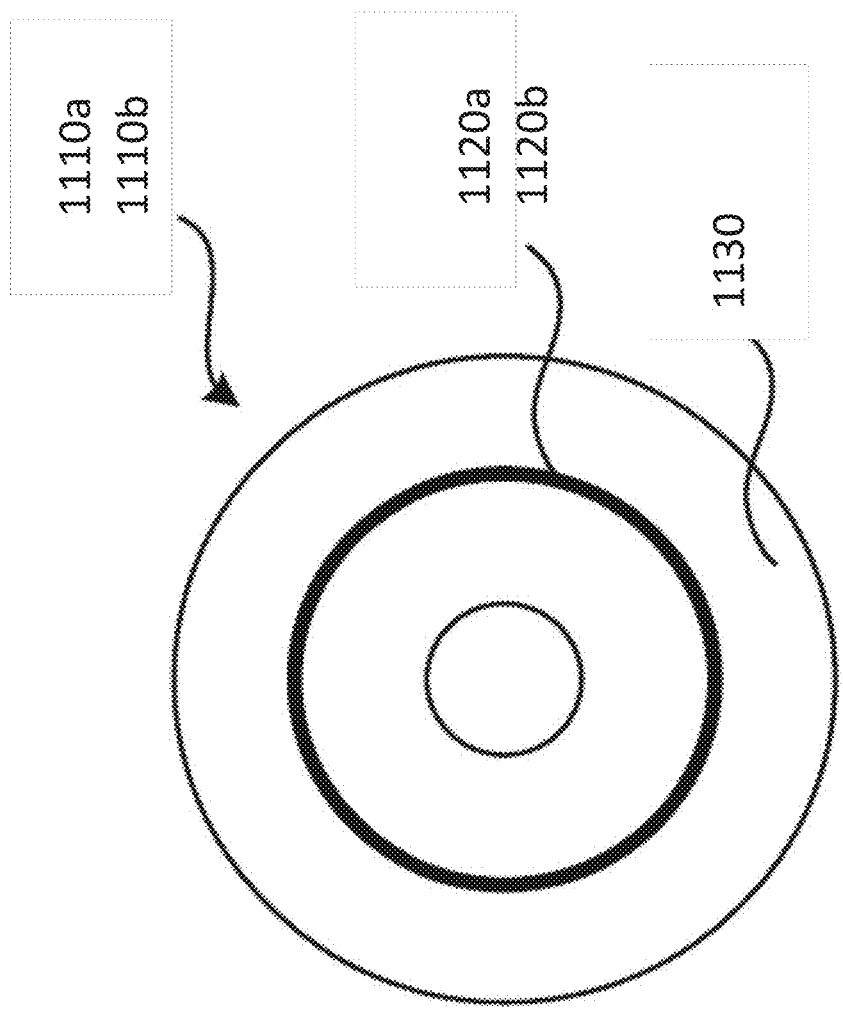

ENERGY EFFICIENT OPERATION OF RADIO NETWORK NODES AND WIRELESS COMMUNICATION DEVICES IN NB-IOT

This application is a 371 of International Application No. PCT/IB2017/051206, filed Mar. 1, 2017, the disclosure of which is fully incorporated herein by reference.

TECHNICAL FIELD

The disclosed subject matter relates generally to telecommunications and more particularly to an energy efficient radio base station for NB-IoT.

BACKGROUND

In recent years, energy efficiency has become an increasingly significant concern in many areas of commerce, including telecommunications. Energy efficiency has gained significance not only from an environmental point of view but also from an economical point of view. For example, for mobile network operators, reducing power consumption results in less money spent on operating expenses.

3GPP has worked on this topic, resulting in several ideas that can be studied, for example, in technical reports 3GPP TR 36.927 v. 13.0.0, entitled "Potential solutions for energy saving for E-UTRAN," and TR 36.887 v. 12.0.0, entitled "Study on energy saving enhancement for E-UTRAN".

Certain approaches to reducing energy consumption in mobile networks are built around overlapping cells where there is one or more so-called coverage cells which are always active and providing basic coverage and overlapping so-called boost cells that may be switched on or off based on network (NW) load generated by the user equipment (UE) in the cells. An example of this approach is illustrated in FIG. 1.

There are also solutions for non-overlapping cells, but these are dependent on having at least one coverage cell adjacent to the compensation cells that may be switched on or off based on said load. An example of this approach is illustrated in FIG. 2.

In the scenarios shown in FIGS. 1 and 2, on/off switching of cells is controlled by the NW without specific UE interaction. This happens either through a centralized operations-administration-maintenance (OAM) function based on e.g. load and traffic statistics obtained from the cells or via distributed/localized function based on information exchange among adjacent cells.

Although the above approaches may be adequate where UEs are moving from coverage cells into boost/compensation cells (in which case the coverage cell can switch on the latter), there is no good way for a switched-off cell with no adjacent coverage cell to detect when UEs are switched on and in need of service.

SUMMARY

An object of embodiments herein is to facilitate energy efficient operation of radio network nodes and wireless communication devices in a wireless communications network implementing NB-IoT protocols.

According to a first aspect, there is presented a method of operating a radio network node. The method includes determining an operating state of the radio network node. The method further includes selectively transmitting a restricted set of system information or a normal set of system information according to the determined operating state.

In an embodiment according to the first aspect, the method further includes detecting low-traffic network conditions, and, in response to detecting the low-traffic network conditions, transitioning from a normal operating state to a restricted operating state.

In another embodiment according to the first aspect, the method includes, during a restricted operating state, detecting a random access preamble transmitted by a wireless communication device, and, in response to detecting the random access preamble, transitioning from the restricted operating state to a normal operating state.

In any of the foregoing embodiments according to the first aspect, the restricted operating state is a low-power operating state.

In any of the foregoing embodiments according to the first aspect, the method further comprises transmitting information indicating whether one or more neighbor cells is in a restricted operating state.

According to a second aspect, there is presented a radio network node comprising at least one processor and memory containing instructions that, when executed by the at least one processor, cause the radio network node to perform embodiments of the method according to the first aspect.

According to a third aspect, there is presented a method of operating a wireless communication device. The method comprises detecting an operating state of a radio network node. The method further comprises, in response to detecting that the operating state is a restricted operating state, transmitting information to the radio network node to initiate a transition of the radio network node from the restricted operating state to a normal operating state.

In an embodiment according to the third aspect, the information transmitted to the radio network node comprises a random access preamble.

In any of the foregoing embodiments according to the third aspect, detecting the operating state of the radio network node comprises detecting a state indicator broadcast by the radio network node.

In any of the foregoing embodiments according to the third aspect, the method further comprises receiving a restricted set of system information from the radio access node during the restricted operating state, and receiving a normal set of system information from the radio access node during the normal operating state.

In any of the foregoing embodiments according to the third aspect, detecting the operating state of the radio network node comprises one of: detecting the operating state based on information received in a master information block (MIB); or detecting the operating state based on synchronization signal patterns.

According to a fourth aspect, there is presented a wireless communication device comprising at least one processor and memory containing instructions that, when executed by the at least one processor, cause the wireless communication device to perform embodiments of the method according to the third aspect.

According to a sixth aspect, there is presented a computer program for operating a radio network node in an NB-IoT enabled system, the computer program comprising computer code which, when run on processing circuitry of the radio network node causes the radio network node to perform embodiments of the method according to the first aspect.

According to a sixth aspect, there is presented a computer program for operating a wireless communication device in an NB-IoT enabled system, the computer program comprising computer code which, when run on processing circuitry of the wireless communication device causes the wireless communication device to perform embodiments of the method according to the third aspect.

Advantageously the disclosed methods, radio network nodes, wireless communication devices, and computer programs allow for a radio network node operating in an NB-IoT to conserve power, conserve network bandwidth resources, and/or reduce network interference without comprising a wireless communication device's ability to access the network.

It is to be noted that any feature of the first, second, third, fourth, fifth, and sixth aspects may be applied to any other aspect, wherever appropriate. Likewise, any advantage of the first aspect may equally apply to any of the other aspects, respectively, and vice versa. Other objectives, features and advantages of the enclosed embodiments will be apparent from the following detailed disclosure, from the attached dependent claims as well as from the drawings. The steps of any method disclosed herein do not have to be performed in the exact order disclosed, unless explicitly stated.

BRIEF DESCRIPTION OF THE DRAWINGS

The drawings illustrate selected embodiments of the disclosed subject matter.

FIG. 11 is a diagram illustrating a computer program product comprising computer readable means according to an embodiment of the disclosed subject matter.

DETAILED DESCRIPTION

Figure 1:
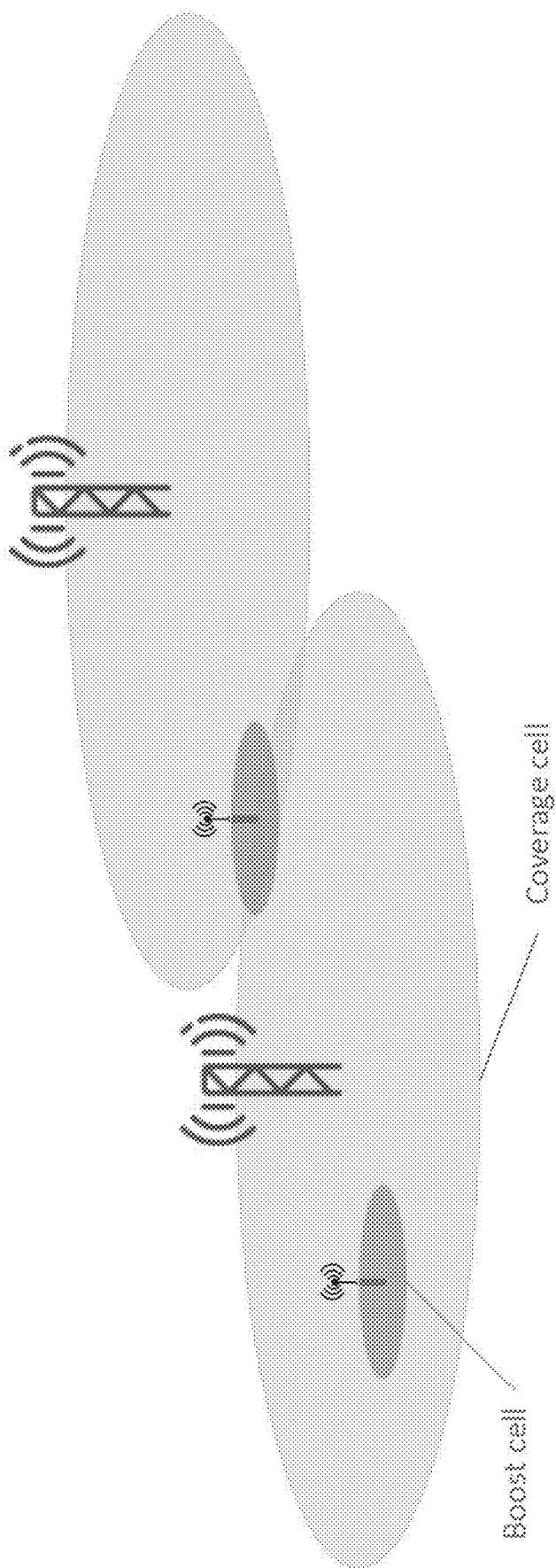
FIG. 1 illustrates two coverage cells providing basic coverage and overlapping boost cells that may be switched on/off based on needed capacity.
Figure 2:
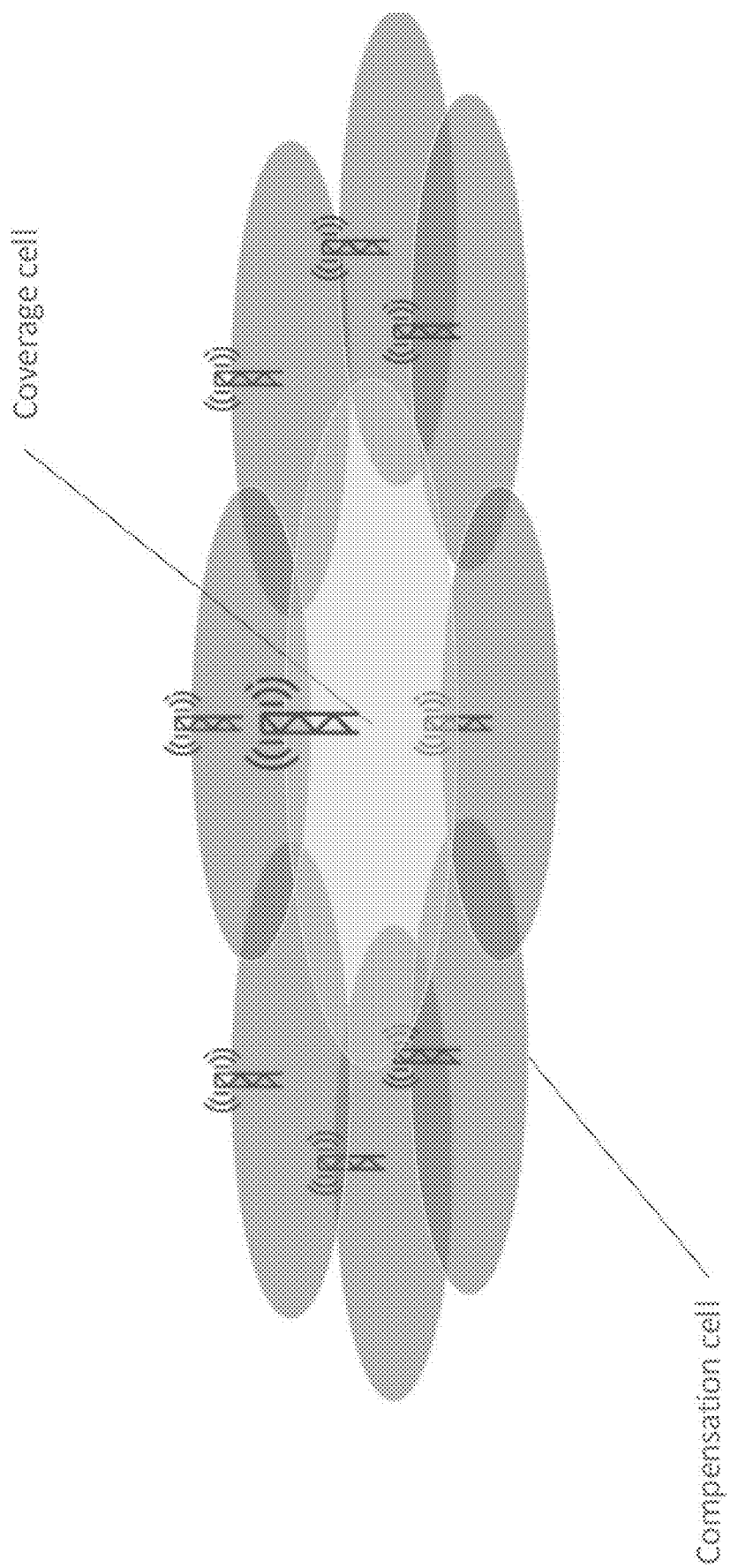
FIG. 2 illustrates a coverage cell adjacent to compensation cells that may be switched on/off based on needed capacity.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Certain embodiments of the disclosed subject matter provide improved energy efficiency for an NB-IoT system, which is a narrowband (180 KHz bandwidth) system being developed for cellular internet of things by 3GPP. The system is based on existing LTE systems and addresses optimized network architecture and improved indoor coverage for massive number of devices with the following characteristics:

low throughput devices (e.g., about 2 Kbps)
low delay sensitivity (approximately 10 seconds)
ultra-low device cost (below 5 dollars)
low device power consumption (battery life of 10 years)

It is envisioned that each cell (covering approximately 1 square kilometer) in this system will serve thousands (approximately 50 thousand) wireless communication devices such as sensors, meters, actuators, and the like.

In certain embodiments, once a radio base station (RBS) (also referred to herein as a radio access node or radio network node) goes into power saving state, only certain signaling/information essential for a UE to detect/measure the cell is still transmitted periodically. In-between the periods, the RBS is switched off.

The UE entering the cell informs the RBS that service is needed and as a result the RBS leaves the power saving state.

A potential benefit of this approach is that an RBS without any supportive adjacent cell can save power and wake up to become fully operational exactly when needed by a UE entering the cell.

In an NB-IoT context, for a UE to be able to camp on a cell and acquire service a set of procedures may comprise:
(initial) cell search to find and measure the quality of the cell,
reading of broadcast information by the UE to see whether it is allowed to camp on the cell and acquiring necessary information for being able to access the cell, and
initiating a connection request through a random access procedure.

For NB-IoT currently 3GPP standardization work is ongoing for defining the details of how the foregoing set of procedures may be carried out.

For the cell search procedure it is in the present document assumed that the 3GPP standards for NB-IoT will, as in LTE, base the cell search procedure design on two synchronization signals: a Primary Synchronization Signal (NB-PSS) and a Secondary Synchronization Signal (NB-SSS).

It is further assumed that from the NW broadcast information, the UE may need to at minimum read the Master Information Block (MIB) for deriving the cell frame timing, the System Information Block 1 (SIB1) for deriving thresholds to see if the cell is suitable and also scheduling information about other SIBs that might be needed, and finally SIB2 for deriving the parameters necessary for accessing the cell.

The above assumptions may not hold true in certain circumstances, and other details may vary as well. For instance, the synchronization signals may be different and have different names, the broadcast information may be in other SIBs than those mentioned. Nevertheless, described concepts are still applicable in alternative scenarios, as will be understood by those skilled in the art.

For the sake of simplicity, in the present document two different RBS states are described. Note that the states below could apply either to the complete bandwidth covered by the RBS or only parts of it (e.g. when an NB-IoT in-band deployment is implemented where bandwidth/resource blocks are shared between LTE and NB-IoT communications):

Fully-operational state (also referred to herein as a normal operating state), in which the RBS receiver and transmitter are available for providing full service to the UEs.

Power saving state (also referred to herein as a restricted operating state) in which the RBS switches off the transmitter and only switches it on periodically. During switched-on period, a restricted set of system information is transmitted for UEs to detect and camp on the cell. Similarly, the receiver may be switched on periodically to detect potential access requests from UEs.

Figure 3:
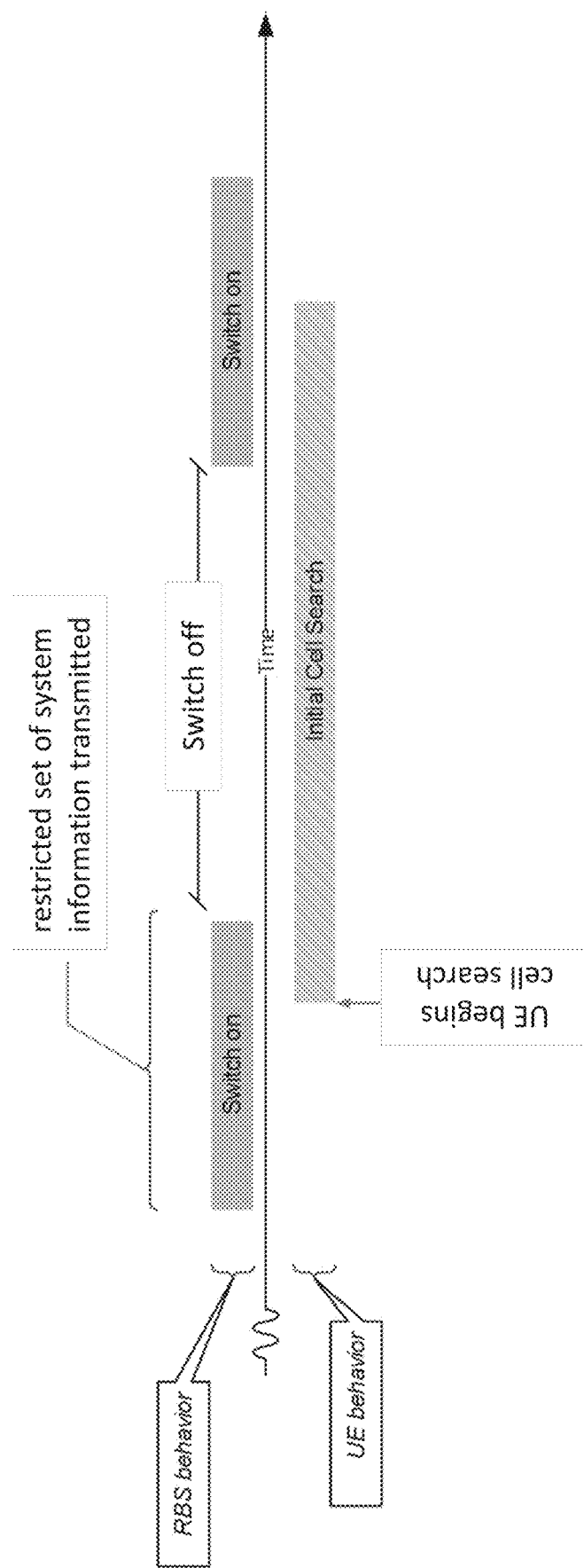
FIG. 3 illustrates an RBS power saving state where a RBS switches off a transmitter; during a switched-on period, a restricted set of signal/information is transmitted for UE to detect and camp on the cell.

FIG. 3 illustrates example behavior of an RBS operating in the restricted operating state and a nearby UE that is searching for an initial cell for network access. The RBS switches on and off for certain periods of time in the restricted operating state. The switch-on period may be shorter than the switch-off period, as depicted, or may be longer in certain embodiments. During the switch-on period a restricted set of system information is transmitted for a UE to be able to detect and use to camp on the cell and acquire service.

The UE may begin a cell search during the switch-on period, as shown, or during the switch-off period. If it begins the cell search during the switch-on period the UE will be able to detect the system information transmitted during the switch-on period. The RBS switch-off period is shorter than a period in which the UE is configured to perform the initial cell search to ensure that the initial cell search period overlaps with a switch-on period of the RBS.

Alternatively, the UE's initial cell search period is configured based on a length of the RBS's switch-off period. For example, in one embodiment the switch-off period is much longer than the switch-on period and much longer than a typical UE's initial cell search period. In such an embodiment, the UE may be configured with an initial cell search period that is longer than the expected RBS transmitter switch-off period. Such a long initial cell search period may be acceptable in, for example, certain stationary UE applications.

Moreover, the UE may be configured to learn the RBS transmitter switch-off period (e.g., by observation or by explicit signaling received from the RBS) and may adapt its initial cell search period when subsequently accessing the RBS. For example, if the RBS transmitter switch-off period is 2 minutes and the UE initial cell search period is 5 minutes, the UE may, upon learning the RBS transmitter switch-off period, reduce its initial cell search period to 2.5 minutes in subsequent access request procedures. In embodiments where one or more UEs are configured with such adaptive behavior, the RBS switch-off period and the UE initial cell search period may be set anywhere from about 1 minute to about 10 minutes.

In one embodiment, the transmitter and receiver of the RBS are switched on and off according to the same frequency. However, in other embodiments, the transmitter may be switched off more frequently than the receiver to save more power and preserve more network bandwidth/resources without compromising the ability of the RBS to receive access requests from UEs and switch to the normal operating state.

More states may exist than the restricted operating state and the normal operating state. For example, a fully dormant state may be entered, e.g., in case an adjacent coverage cell is available, or an OAM function completely switches off the RBS during off-peak hours or the like.

In the power saving state, the RBS aims to only provide system information that is necessary for a UE to camp on and access the cell, with examples of such system information including the following signals:

Synchronization signals NB-PSS and NB-SSS,
MIB on NB-PBCH.
SIB1 on NB-PDSCH,
SIB2 on NB-PDSCH Note that although the same period is given for all signals as an example in FIG. 3 for simplicity, the periodicity of each of the above signals may differ, e.g., SIB2 might be broadcasted much less often than the synchronization signals. Also, the above system information/signals are transmitted far less often in the restricted operating state than in the fully-operational state.

In the restricted operating state, the switch-off period in-between the transmission of synchronization signals may be about 100 to about 800 milliseconds since a UE typically searches cells on one carrier frequency for a few seconds before switching to another frequency.

Also in this state, the RBS receiver is switched on periodically to detect NB-PRACH preambles. Upon such detection, the RBS changes state to the fully-operational state. The receiver switch-on period and the specific preamble to use by the UE for accessing the cell could either be broadcast as part of the system information (e.g., SIB2) or predefined in case the UE knows that the RBS is in the power saving state. Thus based on the latter (predefined configuration), in some embodiments, SIB2 is not necessary to be broadcast and hence more power can be saved as a result of less transmitter activity. Note that different preamble sequence configurations are needed to be predefined/broadcast for UEs in different coverage levels.

There could be different ways for the UE to detect that the RBS is operating in Power Saving state. In some embodiments an indicator could be introduced to be broadcasted e.g. in the MIB.

In some embodiments, the UE can detect the operating state based on signal patterns, such as periodicity, of one or more synchronization signals, such as NB-PSS and/or NB-SSS.

In some embodiments, the aforementioned receive and/or transmit switch-on and switch-off periods during the power saving state might differ at different points in time, e.g. sparser during off-peak hours and denser during other. Moreover, in certain embodiments the receive switch-off period may be held constant while the transmit switch-off periods for at least some of the transmitted signals may be adaptively lengthened based on traffic conditions to preserve power and network resources. The receive switch-off period may be held constant (or below an upper threshold), e.g., to ensure suitably low latency network access for UEs.

In some embodiments, cells can introduce and broadcast a state indicator and schedule for neighboring cells to help out in the cell reselection scenarios. The neighboring cell states and schedule could be communicated among cells through the X2 interface or via a centralized OAM function.

The described embodiments may be implemented in any appropriate type of communication system supporting any suitable communication standards and using any suitable components. As one example, certain embodiments may be implemented in an LTE network, such as that illustrated in FIG. 4.

Figure 4:
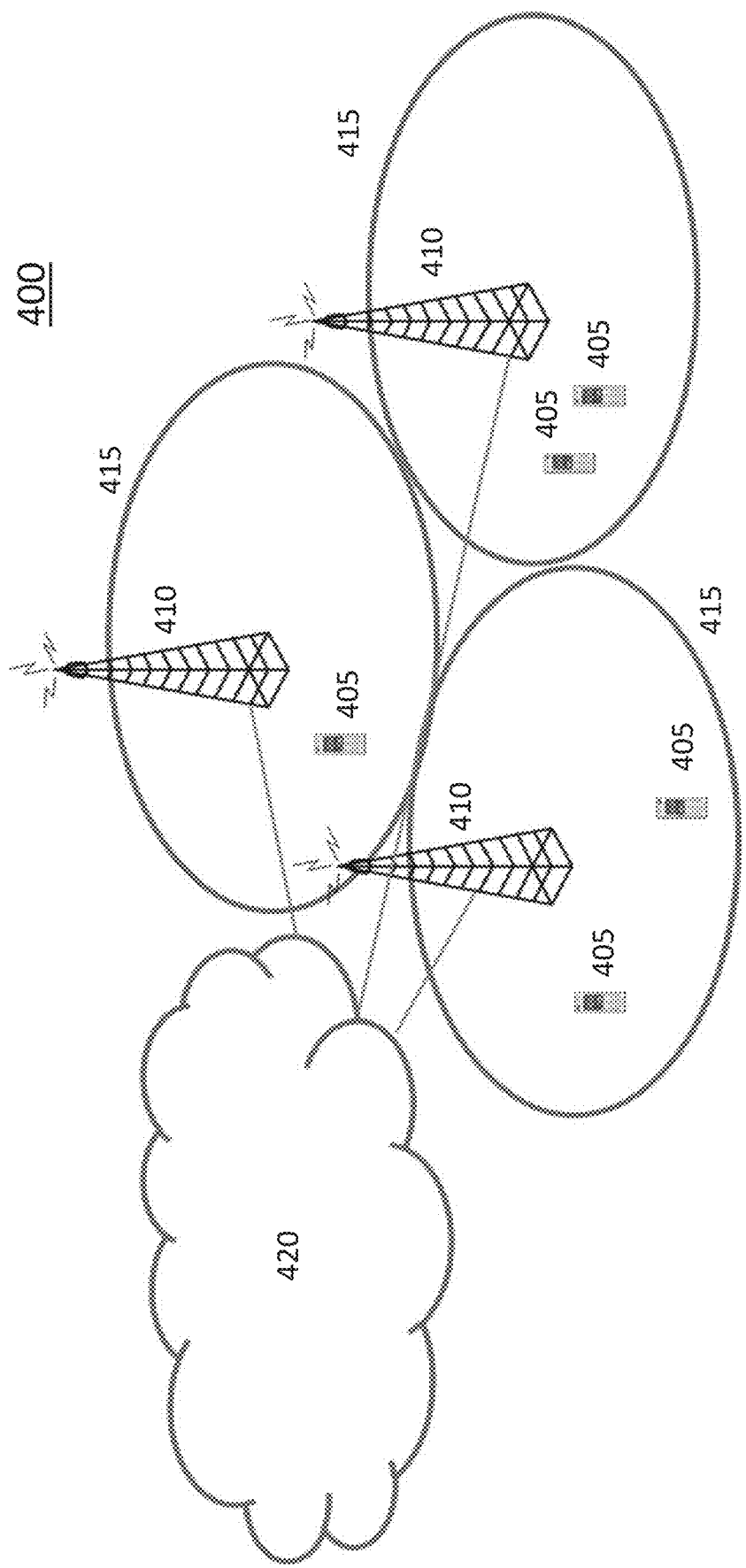
FIG. 4 is a diagram illustrating an LTE network according to an embodiment of the disclosed subject matter.

Referring to FIG. 4, a communication network 400 comprises a plurality of wireless communication devices 405 (e.g., conventional UEs, machine type communication [MTC]/machine-to-machine [M2M] UEs) and a plurality of radio access nodes 410 (e.g., eNodeBs or other base stations). Communication network 400 is organized into cells 415, which are connected to a core network 420 via corresponding to radio access nodes 410. Radio access nodes 410 (also referred to herein as radio network nodes or radio base stations) are capable of communicating with wireless communication devices 405 along with any additional elements suitable to support communication between wireless communication devices or between a wireless communication device and another communication device (such as a landline telephone).

Figure 5:
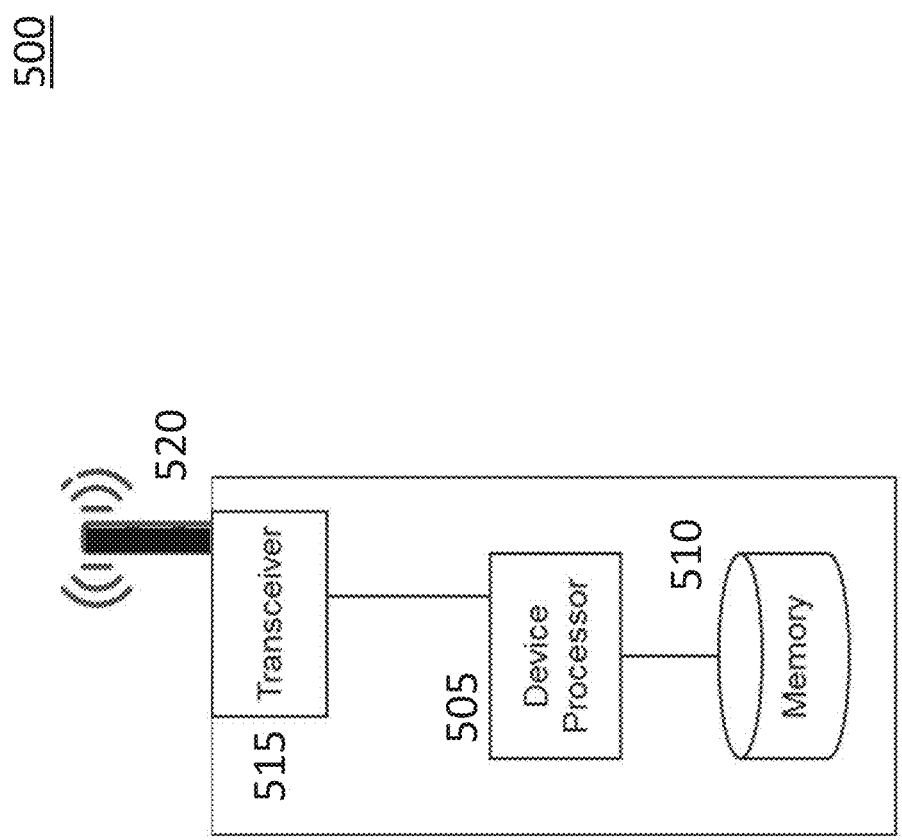
FIG. 5 is a diagram illustrating a wireless communication device according to an embodiment of the disclosed subject matter.

Although wireless communication devices 405 may represent communication devices that include any suitable combination of hardware and/or software, these wireless communication devices may, in certain embodiments, represent devices such as an example wireless communication device illustrated in greater detail by FIG. 5. Similarly, although the illustrated radio access node may represent network nodes that include any suitable combination of hardware and/or software, these nodes may, in particular embodiments, represent devices such as the example radio access node illustrated in greater detail by FIG. 6.

Referring to FIG. 5, a wireless communication device 500 comprises a processor 505, a memory, a transceiver 515, and an antenna 520. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 5. Alternative embodiments may include additional components beyond those shown in FIG. 5 that may be responsible for providing certain aspects of the device's functionality, including any of the functionality described herein.

Figure 6:
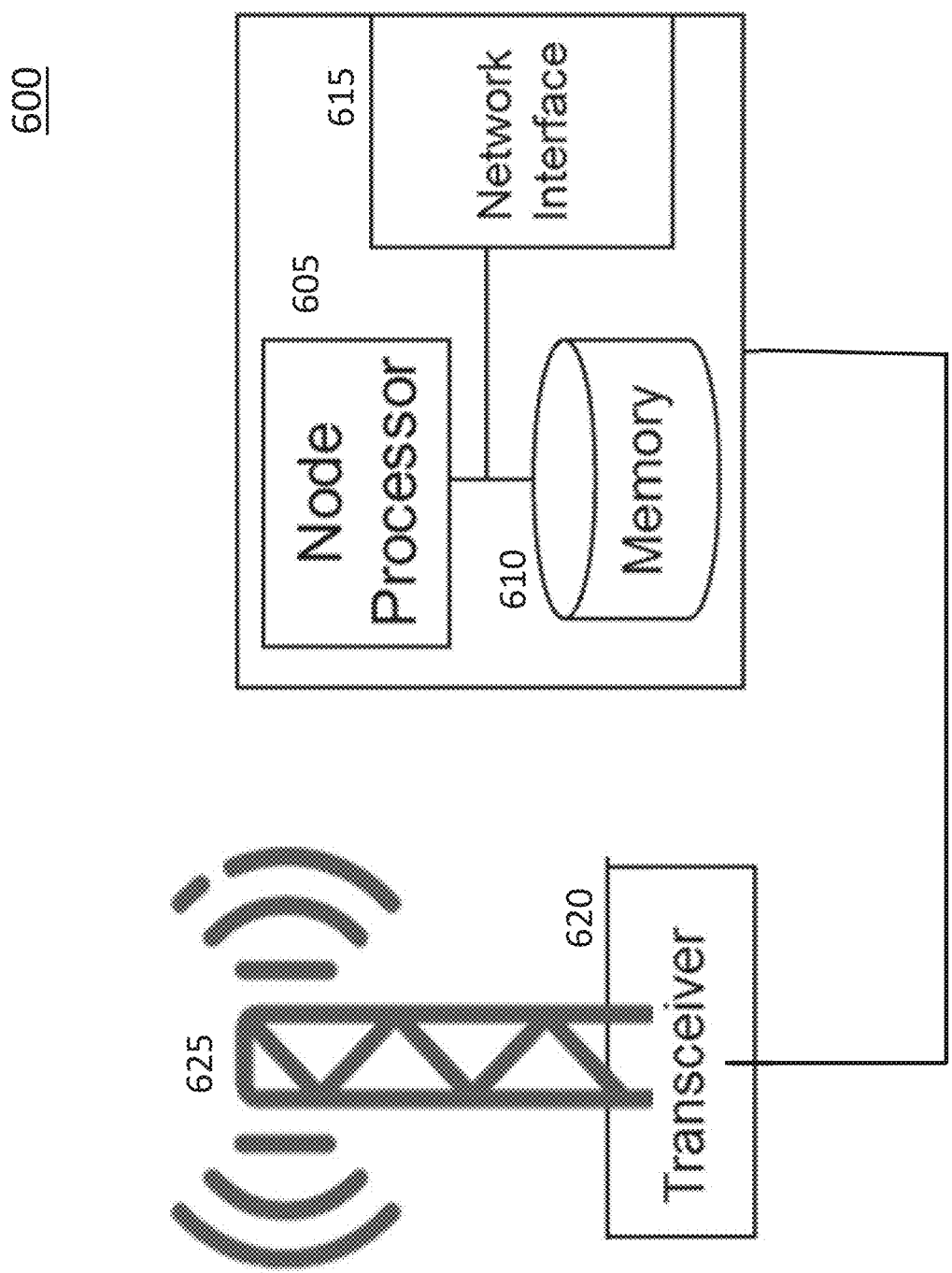
FIG. 6 is a diagram illustrating a radio access node according to an embodiment of the disclosed subject matter.

Referring to FIG. 6, a radio access node 600 comprises a node processor 605, a memory 610, a network interface 615, a transceiver 620, and an antenna 625. In certain embodiments, some or all of the functionality described as being provided by a base station, a node B, an enodeB, a gnodeB, and/or any other type of network node may be provided by node processor 605 executing instructions stored on a computer-readable medium, such as memory 610 shown in FIG. 6. Alternative embodiments of radio access node 600 may comprise additional components to provide additional functionality, such as the functionality described herein and/or related supporting functionality.

Figure 7A:
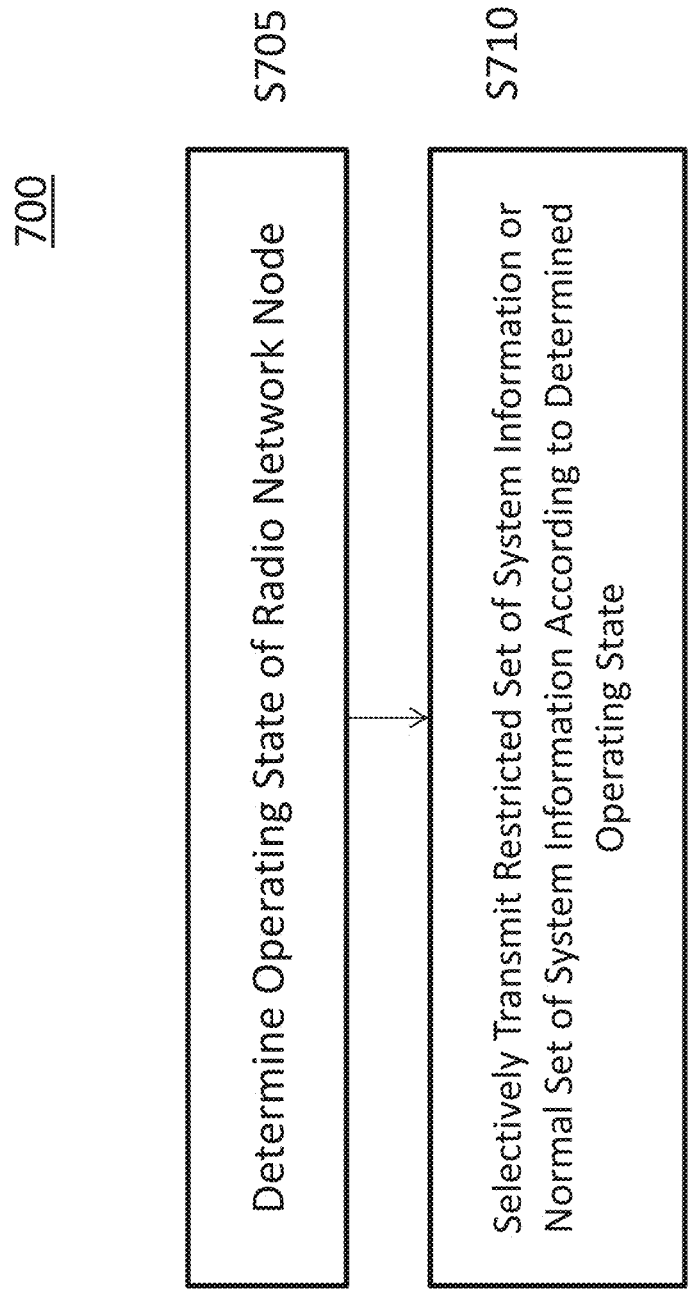
FIGS. 7A and 7B are flowcharts illustrating a method of operating a radio access node according to an embodiment of the disclosed subject matter.
Figure 7B:
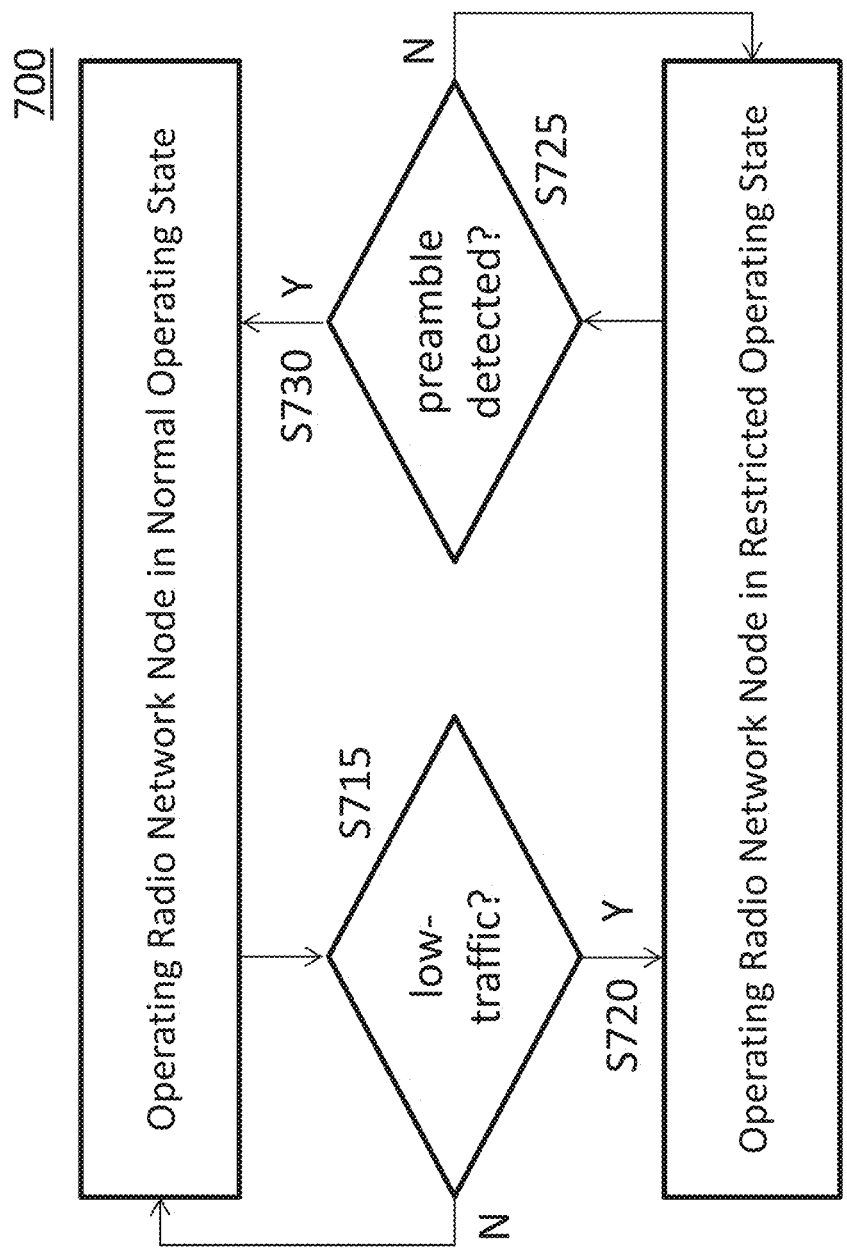

FIGS. 7A and 7B are flowcharts illustrating a method 700 of operating a radio access node according to an embodiment of the disclosed subject matter.

Referring to FIG. 7A, the method 700 comprises determining an operating state of the radio network node (S705), and selectively transmitting a restricted set of system information or a normal set of system information according to the determined operating state (S710). During a fully-operational state (e.g., a "normal operating state"), the radio network node may be available for providing full service to UEs. In a power saving state (e.g., a "restricted operating state"), the radio network node may switch off the transmitter and only switch it on periodically. During switched-on period, the restricted set of signal/information may be transmitted for UEs to detect and camp on the cell. Similarly, the RBS receiver may be switched on periodically to detect potential access from the UE. For example, the RBS receiver may be configured to receive a random access preamble from a wireless communication device during the restricted operating state. In response to detecting the random access preamble, the RBS transitions from the restricted operating state to a normal operating state.

Referring to FIG. 7B, the method may further include detecting low-traffic network conditions (S715), in response to which the radio network node transitions from a normal operating state to a restricted operating state (S720). Moreover, while in the restricted operating state, the radio network node detects a random access preamble transmitted by a wireless communication device (S725) and, in response to detecting the random access preamble, transitions from the restricted operating state to the normal operating state (S730). The normal set of system information typically comprises, in addition to necessary synchronization signals (which be sparse in time depending on the operational state), a number of blocks. These blocks typically include, at a minimum, a Master Information Block (MIB), which contains a System Frame Number, LTE inband information, Access Barring indicator. SIB1 scheduling information, etc., a System Information Block (SIB1) containing PLMN Id, Tracking areas code, Cell selection parameters, scheduling information for other SIBs, an SIB2 containing Channel configuration for BCCH, PCCH and channels needed for accessing the cell. The above would typically constitute a minimum amount of SIBs that would be needed for being operational in a cell, although other SIBs are typically used as well, such as e.g. SIBs a 3,4,5 for neighbor cell information, SIB16 for UTC, etc.

The above-mentioned MIB/SIBs (MIB, SIB1, SIB2) are typically broadcast in the normal state. In contrast, in the restricted operating state (e.g., a power saving state), all channel configurations may not be needed in SIB2 (only the random access preamble for accessing the cell). Alternatively, SIB2 may not need to be broadcast at all if, for example, a technical specification predefines a random access preamble for turning on a cell. In certain embodiments the MIB includes an indicator that tells the UE that it is operating in the power saving state and hence the UE knows that condensed versions of SIB1/2 are expected to be decoded.

Figure 8:
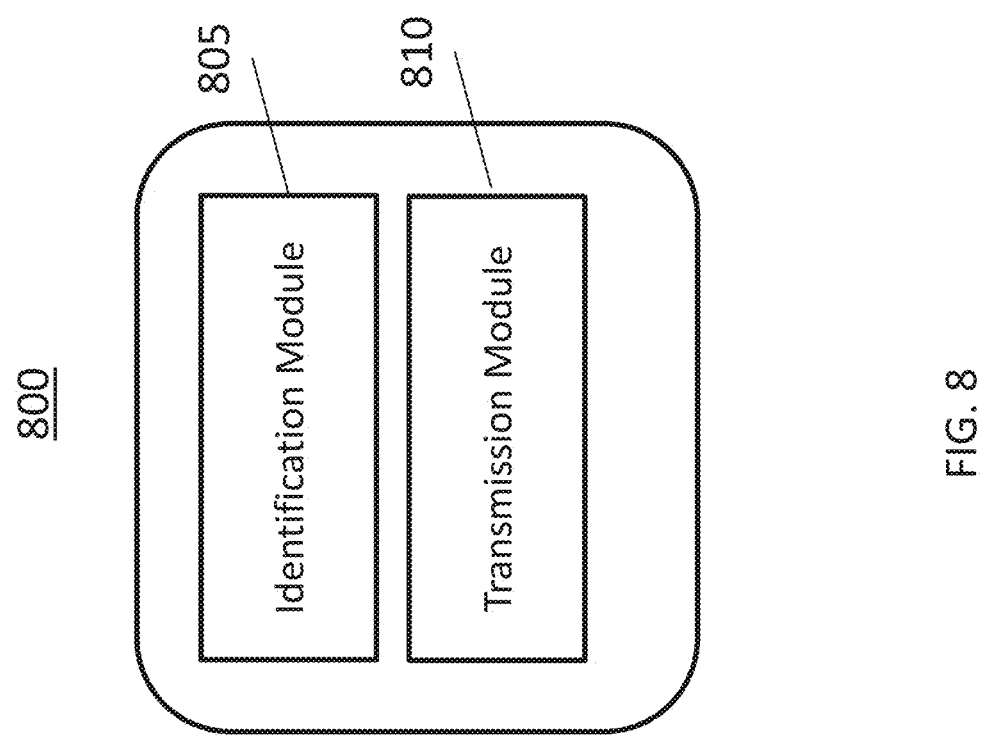
FIG. 8 is a diagram illustrating a radio access node according to an embodiment of the disclosed subject matter.

FIG. 8 is a diagram illustrating a radio access node 800 according to an embodiment of the disclosed subject matter. Referring to FIG. 8, the radio access node 800 comprises a determining module 805 configured to determine an operating state of the radio network node, and a transmission module 810 configured to selectively transmit a restricted set of system information or a normal set of system information according to the determined operating state.

Figure 9:
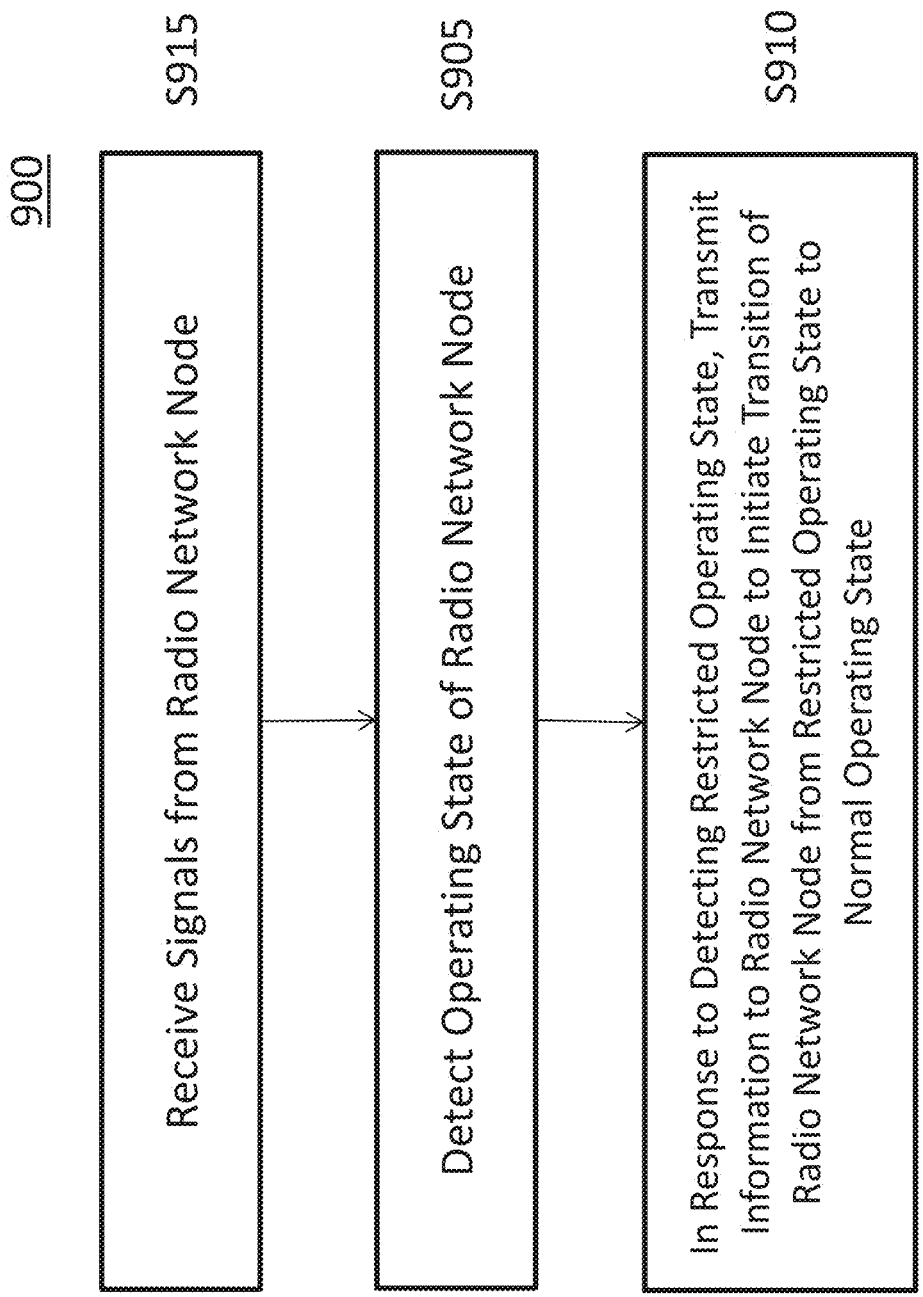
FIG. 9 is a flowchart illustrating a method of operating a wireless communication device according to an embodiment of the disclosed subject matter.

FIG. 9 is a flowchart illustrating a method 900 of operating a wireless communication device according to an embodiment of the disclosed subject matter. Referring to FIG. 9, the method 900 comprises detecting an operating state of a radio network node (S905), and in response to detecting that the operating state is a restricted operating state, transmitting information to the radio network node to initiate a transition of the radio network node from the restricted operating state to a normal operating state (S910).

In one embodiment, the wireless communication device first receives signals from the radio network node (S915) to be able to detect the operating state. For example, the wireless communication device may receive a restricted set of system information from the radio access node during the restricted operating state, and receiving a normal set of system information from the radio access node during the normal operating state. Based on which set of system information is received, the wireless communication device may detect the operating state of the radio network node. Alternatively, the wireless communication device may detect the operation state by recognizing information received in a master information block (MIB) as indicating that the radio network node is operating in the restricted operating state or based on synchronization signal patterns.

Figure 10:
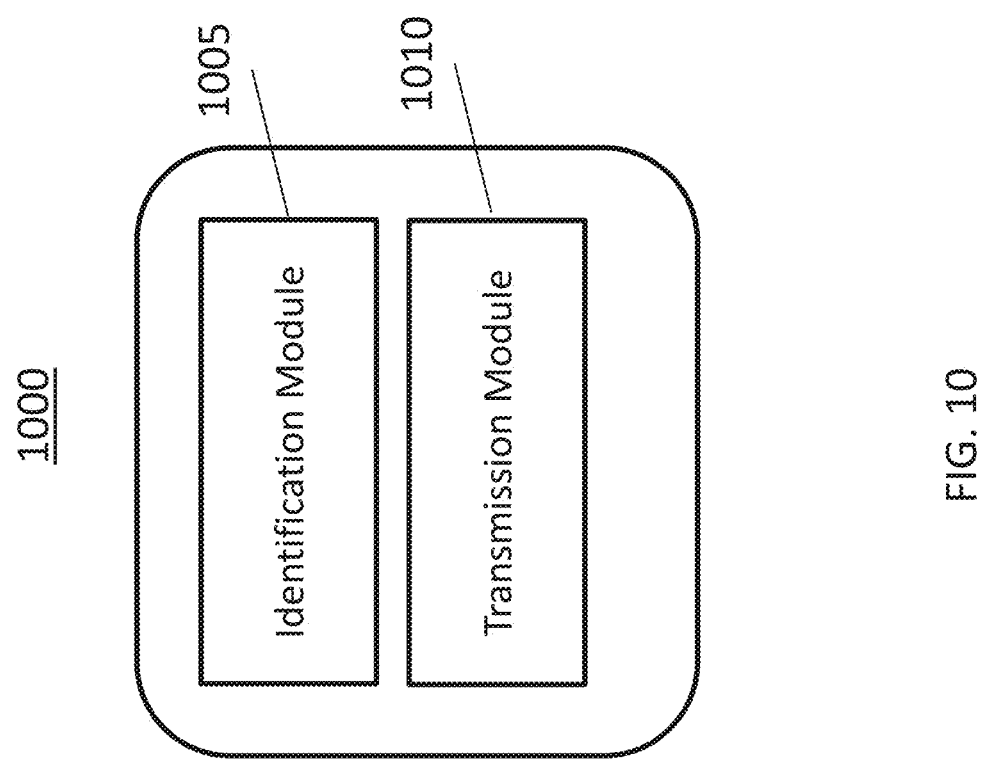
FIG. 10 is a diagram illustrating a wireless communication device according to an embodiment of the disclosed subject matter.

FIG. 10 is a diagram illustrating a wireless communication device 1000 according to an embodiment of the disclosed subject matter.

Referring to FIG. 10, the wireless communication device 1000 comprises a detection module 1005 configured to detect an operating state of a radio network node, and a transmission module 1010 configured to, in response to detecting that the operating state is a restricted operating state, transmit information to the radio network node to initiate a transition of the radio network node from the restricted operating state to a normal operating state.

In some embodiments, a computer program comprises instructions which, when executed by at least one processor, causes the at least one processor to carry out the functionality of a radio access node (e.g., radio access node 600 or 800) or another node (e.g., a remote processing node that interfaces with the radio access node) implementing one or more of the functions of the radio access node in a virtual environment according to any of the embodiments described herein. Similarly, in some embodiments, a computer program comprises instructions which, when executed by at least one processor, causes the at least one processor to carry out the functionality of a wireless communication device (e.g., wireless communication device 500 or 1000) according to any of the embodiments described herein.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the RE as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the REC as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a. 1120b is here schematically shown as a track on the depicted optical disk, the computer program 1120a. 1120b can be stored in any way which is suitable for the computer program product 1110a, 1110b.

As indicated by the foregoing, certain embodiments of the disclosed subject matter relate to semi-operation of a radio base station (RBS) with just enough activity to enable UEs to detect the cell. The RBS may become fully operational with the help of UE through usage of a random access preamble transmission.

The following abbreviations are used in this written description.

| Abbreviation | Explanation |
| --- | --- |
| LTE | Long Term Evolution |
| MIB | Master Information Block |
| NB | Narrowband |
| NB-IoT | NB Internet of Things |
| NB-DLSCH | NB Downlink Shared Channel |
| NB-PRACH | NB Physical Random Access Channel |
| NB-PSS | NB Primary Synchronization Signal |
| NB-SSS | NB Secondary Synchronization Signal |
| NB-PBCH | NB Physical Broadcast Channel |
| NW | Network |
| OAM | Operations, Administration, Maintenance |
| RBS | Radio Base Station |
| SIB1 | System Information Block 1 |
| SIB2 | System Information Block 2 |
| UE | User Equipment |

While the disclosed subject matter has been presented above with reference to various embodiments, it will be understood that various changes in form and details may be made to the described embodiments without departing from the overall scope of the disclosed subject matter.

The invention claimed is:

1. A method of operating a wireless communication device, comprising:
   receiving a pattern of synchronization signals from a radio network node during a cell search period;
   detecting an operating state of the radio network node based on the pattern of the received synchronization signals;
   in response to detecting that the operating state is a restricted operating state:
      transmitting an access request to the radio network node; and
      learning a transmit switch-off period of the radio network node, wherein the transmit switch-off period is a period of time during which a transmitter of the radio network node is switched off to save power when the radio network node is in the restricted operating state; and
   adapting the cell search period for a subsequent cell search based on the learned transmit switch-off period.

2. The method of claim 1, wherein the access request transmitted to the radio network node comprises a random access preamble.

3. The method of claim 1, wherein detecting the operating state of the radio network node comprises detecting a state indicator broadcast by the radio network node.

4. The method of claim 1, further comprising:
   receiving a restricted set of system information from the radio access node during the restricted operating state, and
   receiving a normal set of system information from the radio access node during the normal operating state.

5. The method of claim 1, wherein detecting the operating state of the radio network node comprises
   detecting the operating state based on a periodicity of the received synchronization signals.

6. The method of claim 1, wherein adapting the cell search period includes adapting the cell search period to be longer than the learned transmit switch-off period of the radio network node.

7. The method of claim 1, further comprising receiving information indicating whether one or more neighbor cells is in a restricted operating state.

8. A wireless communication device, comprising:
   at least one processor; and
   memory containing instructions that, when executed by the at least one processor, cause the wireless communication device to:
      receive a pattern of synchronization signals from a radio network node during a cell search period;
      detect an operating state of the radio network node based on the pattern of the received synchronization signals;
      in response to detecting that the operating state is a restricted operating state:
         transmit an access request to the radio network node; and
         learn a transmit switch-off period of the radio network node, wherein the transmit switch-off period is a period of time during which a transmitter of the radio network node is switched off to save power when the radio network node is in the restricted operating state; and
         adapt the cell search period for a subsequent cell search based on the learned transmit switch-off period.

9. The wireless communication device of claim 8, wherein the access request transmitted to the radio network node comprises a random access preamble.

10. The wireless communication device of claim 8, wherein detecting the operating state of the radio network node comprises detecting a state indicator broadcast by the radio network node.

11. The wireless communication device of claim 8, wherein detection of the operating state of the radio network node comprises
   detecting the operating state based on a periodicity of the received synchronization signals.

12. The wireless communication device of claim 8, wherein the instructions further cause the wireless communication device to receive information indicating whether one or more neighbor cells is in a restricted operating state.

* * * * *